June 8, 1926.
N. HARRISON
STORAGE BATTERY
Filed Feb. 14, 1923
2 Sheets-Sheet 1
1,587,951
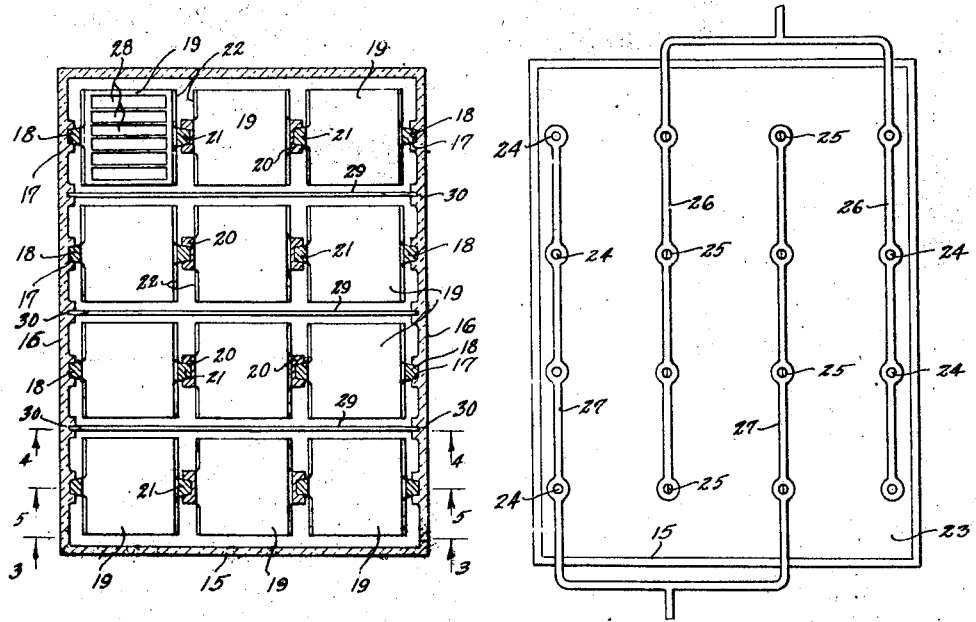
Fig. 1.
Fig. 2.
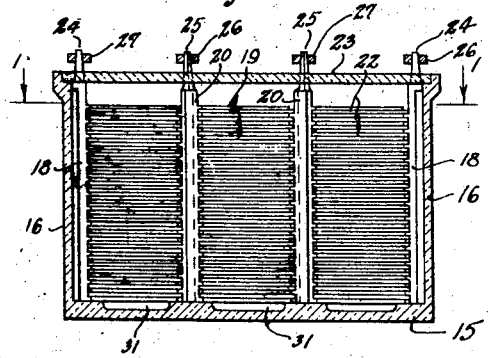
Fig. 3.
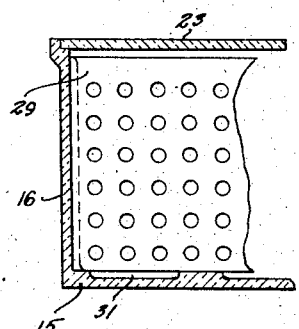
Fig. 4.
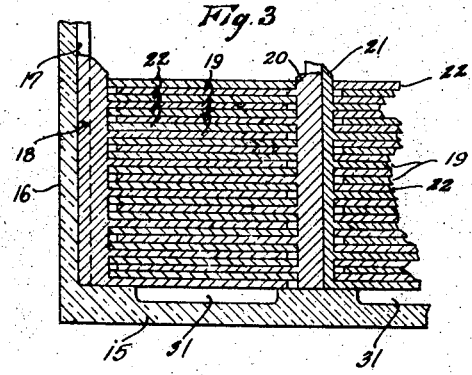
Fig. 5.
INVENTOR
Newton Harrison
BY
Wooster & Davis
ATTORNEYS

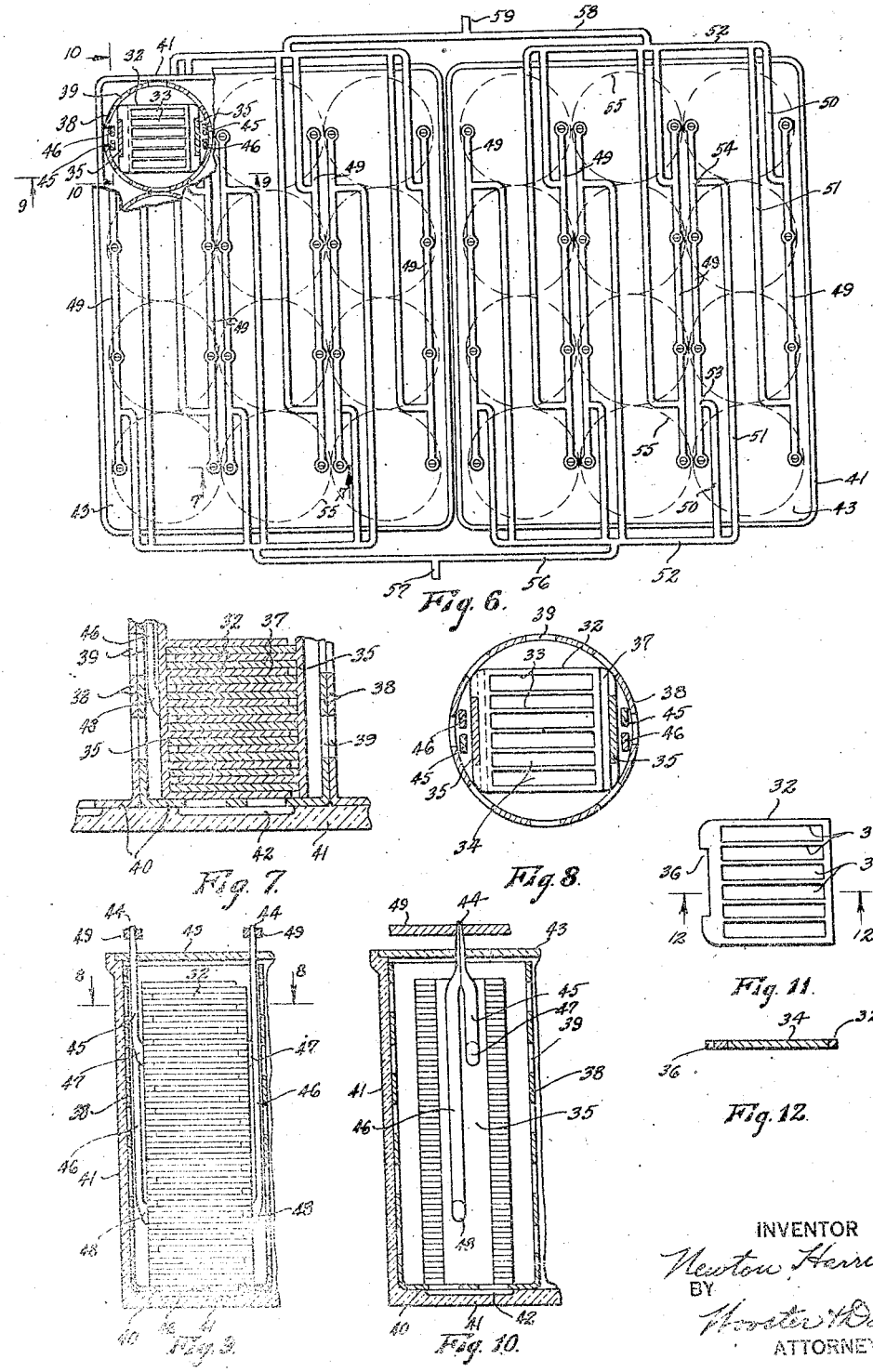

Patented June 8, 1926.

1,587,951

UNITED STATES PATENT OFFICE.

NEWTON HARRISON, OF MILFORD, CONNECTICUT.

STORAGE BATTERY.

Application filed February 14, 1923. Serial No. 618,904.

This invention relates to secondary or storage batteries and cells, and has for an object to provide a battery or cell of this type which may be charged in a minimum of time or discharged under maximum load without injury.

It is also an object of the invention to provide a more efficient battery or cell and one that will have an unusual capacity and a long life.

It is another object of the invention to provide a storage battery structure by which the active material may be subdivided to an extreme degree so as to expose the greatest possible surface to the electrolyte.

It is a further object of the invention to produce a storage battery cell which will have the greatest possible practicable exposure of active material to electrolyte per unit of weight of this active material.

It is still another object of the invention to produce a battery cell which will have a much greater capacity for a given weight than can be secured with the batteries now generally employed, or to secure a battery of the same capacity of those now generally used but which will be much lighter in weight.

Another object of the invention is to produce a storage cell of greatly reduced internal resistance.

A still further object of the invention is to provide supports for the active material which will sustain the same in such a manner that it will not only be exposed to the electrolyte to the maximum extent but also so that it will not easily become loosened from the supports and thus be useless in operation, and therefore, the capacity of the battery will not be reduced or the active material wasted.

To secure the above mentioned results I utilize in my battery cell a relatively large number of small thin plates for supporting the active material, and I arrange these plates in a multiple unit system. That is each cell of the battery comprises a multiplicity of localized electrical units, each unit being a complete electrical entity in itself consisting of a plurality of positive and negative plates, with a conductor connected to all the positive plates of the unit and another conductor connected to all the negative plates of the unit. As these plates may be made small in size and thin the greatest possible practicable number of units can be employed, and thus the active material may be subdivided to the greatest degree practicable so as to expose the greatest possible surface of a given weight of active material to the electrolyte. This will give a greater power of rapid charging and discharging than ever before attained.

In practice a unit of this multiple unit cell will consist of a large number of these plates preferably substantially horizontally arranged one above the other in alternation and separated from each other by a thin porous separator, and an ordinary cell would consist of a large number of these units and in the cell each unit is connected to its neighbor in such a manner that each unit produces its full quota of electricity on being discharged or takes its full quota of electricity on being charged.

Theoretically the best results would be secured by using a layer of active material as nearly of infinitesimal thickness as possible and passing through this a normal current per unit of area, in which event we would get a maximum charge in a minimum of time and a maximum discharge in a minimum of time without any abnormal conditions obtaining because all of the active material would be exposed to the electrolyte. In fact if the active material presented a thin film to the electrolyte, theoretically a current of hundreds or thousands of amperes applied for a few minutes or less would reduce it to a fit condition for service without any abnormal current flow per unit of area. Also on the other hand the same enormous surface of a thin layer of active material would supply an enormous current on discharge without an abnormal flow per unit of area. My invention is directed to getting as nearly as possible to this theoretical condition in a practical construction. It is a question largely of having a thin but appropriate grid in a battery of this kind to expose the active material to as great a surface as possible.

By carrying out this principle a cell can be practically built which is capable of being charged or discharged in three hours, two hours, one hour, one-half hour, or such number of minutes as express the final limitation of the proportions of surface exposed to thickness of active material.

My system of subdivision of the active material in this multiple unit cell will allow an increase in the charging and discharging rates without increasing the current density per unit of surface of active material, and with the same density of current per unit of surface of active material I may charge or discharge the battery in a much shorter time without injury, as for a given weight of active material I obtain a maximum surface exposed to the electrolyte with a minimum of thickness, therefore using the entire amount of active material, none of it being wasted. It is impossible to do this in all modern structures of storage batteries. In such cells the process of boosting or heavy abnormal discharge increases the current density per unit of area of the surface of active material exposed to the electrolyte above the current density this material can handle with safety.

This exposes the plates to stresses and strains and causes loosening and dislodgment of active material due to the excessive expansion and contraction caused by this boosting. This is not true in my cell as a heavy charging or discharging current may be used without increasing the current density per unit of surface area of the active material above the normal rate. To further obviate this difficulty I place the plates substantially horizontally and separate them by porous wooden separators which assist in retaining the active material in the plates. I may also, if desired, incline the plates somewhat to assist in freeing their surfaces of gas bubbles and thus preventing polarization, but as with my construction of battery cell the current density per unit of surface of active material exposed to the electrolyte is never abnormal, there is never abnormal polarization, and, with normal charging and discharging currents the polarization is decreased because with these rates of charge and discharge the current density per unit of surface of active material is so small that it will not produce polarization.

Another advantage I secure by this multiple unit cell is reduced resistance in the cell as the exposed surface of the active material is increased. Thus there would be no increase of current density per unit of cross sectional area of electrolyte with the increased charging and discharging amperage employed, and so there would be no heating with these increased amperages above that of ordinary practice in the cells now in use. On the other hand, the exposed surface of active material is very great in this multiple unit cell. Therefore the ordinary discharge of the present commercial storage cell if used in my cell would mean a much less density of current per unit of area. As a result the current density per unit of cross sectional area of the electrolyte is very small, so consequently there is less resistance, less heating, less heat losses and a greater efficiency than in the ordinary cells.

The theoretical weight of active material required for an ampere hour for a negative plate is approximately .140 of an ounce. On this basis about seven ampere hours may be expected from an ounce of active material theoretically. From this point of view a pound of active material consisting of sixteen ounces is theoretically able to supply about 112 ampere hours on the basis given. For quick discharges this is impossible in ordinary practice because of the limited surface exposed to the electrolyte necessary through the thickness of the supporting grid. If it is not so necessary to have a thick supporting grid, a given weight of active material can present a much greater surface to the electrolyte and, therefore, can much more easily handle a heavy discharging current.

In fact, if the active formed material presented a thin film to the electrolyte, theoretically a current of hundreds or thousands of amperes applied for a few minutes or less would reduce it to a fit condition for service. On the other hand the same enormous surface of a thin layer of active material would supply an enormous current on discharge. It is a question largely of having a large number of thin but appropriate grids duplicated a great many times in a battery of this kind to expose the active material to as great a surface as possible.

From the results secured in practice about .04 of an ampere per square inch of surface of active material exposed on the positive plate to the electrolyte is considered satisfactory in discharging. It is a logical conclusion from this that my system of subdivision of the active material will not interfere with modern practice, but will allow the use of much heavier charging and discharging rates without going beyond what is considered good practice. Thus the greater the area of active material exposed to the electrolyte per unit of weight of this active material the greater may be the current used in charging and discharging without increasing the normal current density per unit of exposed surface, and therefore, the shorter will be the time required. Thus, for example, if the surface of active material exposed to the electrolyte be doubled I may double the total charging or discharging current without increasing the current density per unit of area of surface exposed to the electrolyte and will cut the time for charging in half, or in proportion to the increase in exposed surface.

Another important result secured with my multiple unit battery cell is that the plates are much stronger in proportion to the area exposed than the large plates now generally employed. The large plates are made as thin as possible in an attempt to increase the exposed surface and so they are relatively thin in proportion to their area and are thus of a comparatively weak construction, while the small plates which I use, although thin, are relatively thick in proportion to their area, and so are correspondingly stronger. In my invention plates of a sixteenth of an inch in thickness or less can be employed, yet each individual plate in comparison with its area, will be strong and rugged in contrast with the relatively weak construction in comparison with surface and thickness, and thus the weight, of the large plates now in daily use.

Furthermore, the large plates now generally used, although made as thin as practicable, must be made of considerable thickness in order to support their weight and the weight of the active material, and it will, therefore, be apparent that these large plates occupy a great deal of space within the battery cell which is useless for current generating and absorbing purposes. This is because the depth to which the electrolyte reacts with the active material is very small, very seldom more than one thirty second of an inch and usually, if not always, much less than that. By using individual plates of small area, as in my cell, they may be made of a thickness of one sixteenth of an inch or less, thus leaving one thirty second of an inch or less, according to thickness of plate used, of active material to be acted upon by the electrolyte from each side of the plate. Thus it will be seen that in cells constructed of these small plates there is a minimum of space which is useless for generating and absorbing purposes.

This application is a continuation in part of my prior application Serial No. 569,490 for storage battery, filed June 19, 1922.

In the accompanying drawings—

Fig. 1 is a sectional plan view of one arrangement of cell taken substantially on line 1—1 of Fig. 3.

Fig. 2 is a top plan view of the cell showing one method of making the connections for leading the current from and to the cell.

Fig. 3 is a transverse section substantially upon line 3—3 of Fig. 1.

Fig. 4 is a partial transverse section substantially upon line 4—4 of Fig. 1.

Fig. 5 is a partial transverse section substantially upon line 5—5 of Fig. 1.

Fig. 6 is a top plan view of a two cell battery of a slightly different construction and also showing a slightly different method of connecting the conductors for supplying current to and taking it from the battery, one of the units in the cell being shown in section.

Fig. 7 is a vertical section through the lower end of one of the units.

Fig. 8 is a transverse horizontal section through one of the units.

Fig. 9 is a vertical section substantially upon the line 9—9 of Fig. 1.

Fig. 10 is a similar section substantially upon line 10—10 of Fig. 1, and looking from the right of Fig. 9.

Fig. 11 is a detailed plan view of one of the plates, and

Fig. 12 is a transverse section thereof substantially upon line 12—12 of Fig. 11.

Referring to Figs. 1 to 5, numeral 15 indicates the jar or container for the cell which may be of any suitable material for the purpose such as glass, hard rubber or the like. As shown in this type of cell the opposite side walls, indicated at 16, are provided with vertically extending grooves 17 in which are fitted vertically extending posts or conductors 18 which rest at their lower ends on the bottom of the container. To each post are connected a plurality of spaced relatively thin plates 19 which, in the present instance, are substantially horizontally arranged, as shown, and extend toward the center and transversely of the container.

Between the posts 18 are other posts 20 and 21, the posts 20 being grooved to receive the posts 21 and each one of these posts are connected to a plurality of spaced plates 19 the same as are the posts 18. The lower ends of the posts 20 and 21 also rest upon the bottom of the container. The plates 19 connected to these posts extend in opposite directions and are interleaved with the plates connected with the opposed posts as indicated, the adjacent plates, however, being separated by porous separating plates 22 which may be of wood or other suitable material. These separators are of somewhat greater length than the plates 19 so as to keep the posts separated a sufficient distance so that the free edge of the plates 19 do not contact with the opposite post and which is of opposite polarity. At their upper ends these posts are extended upwardly through suitable openings in the cover plate 23 to provide binding posts 24 and 25 adapted for connection with the conductors or bus bars 26 and 27. It will be noted that the posts 20 and 21 are both extended upwardly to form connection with the bus bar so that there will be a good electrical connection with each one of these posts without the necessity of burning the two posts together.

In the multiple unit cell shown I have illustrated twelve localized units each unit being a complete electrical entity in itself consisting of positive and negative elements with conductors connecting the positive elements and conductors connecting the negative elements, and each element comprises a relatively thin small plate 19 which holds the active material. These plates are preferably provided with elongated slots or openings 28 which are filled with the active material, these slots or openings extending through the plates so that the active material is exposed to the electrolyte on the opposite side thereof.

As the posts 20 and 21 are nested it will be apparent that in the specific arrangement shown three of the electrical units are rigidly connected together across the cell, although each unit from the electrical standpoint is complete in itself and independent of the other units, this being merely a detailed construction which may be varied if desired. Between the sets of three units I have placed perforated separating plates 29 which are vertically arranged and supported by any suitable means such as grooves 30 on the inner walls of the container in which the edges of these plates are seated. These plates are preferably of insulating material and are provided to keep adjacent units from coming in contact with each other. The container is provided in the bottom thereof with cutaway portions 31 to allow free circulation of the electrolyte.

It will be apparent from an inspection of Fig. 2 that all of the posts connected with the positive elements of the respective units are connected together as are also all the posts connected with the negative elements of these separate units.

Referring now to Figs. 6 to 12 inclusive I have shown a slightly different arrangement of the units and also a slightly different construction thereof. I have still further shown two complete cells and the method of connecting the same. In this form each unit comprises a plurality of spaced positive and negative elements the same as the first form, these elements being substantially horizontally arranged plates 32 of suitable conducting material and having elongated slots or openings 33 to hold the active material 34, these plates being also of relatively small area and thin as in the first form.

These plates are connected by vertical posts 35 which may be of any suitable construction, but I prefer to recess one edge of the plates, as shown at 36, through which the posts 35 may extend to facilitate burning of the plates to this post. The positive and negative plates are separated by porous separators 37, the same as in the first form, which may be wood or other suitable material, and these separators are of a length to contact at their opposite ends with the posts 35 to prevent either post from coming in contact with the plates of the opposite polarity. Each set of a plurality of positive and negative plates constitutes a complete electrical entity or unit immersed in the electrolyte, and each unit is enclosed in a tubular casing 38 which is of insulating material and provided in the walls thereof with a plurality of perforations 39 to facilitate free circulation of the electrolyte. The lower ends of these tubes or casings are preferably closed by a perforated end wall 40 either integral with the tube or secured thereto by any suitable means and against which the lower ends of the posts rest. The plates 32 rest at the corners on the opposite sides of the posts against the inner walls of these tubes, as shown in Fig. 8, and thus these sets of plates are positively mounted and supported, each unit may be assembled outside the cell and then the suitable number of units assembled therein as desired to form a completed cell. The tubes are preferably of such diameter that when placed within the container, indicated at 41, they are in contact forming a fairly close fit so as to sustain each other from movement within the container. The bottom of the container is also cut away, as shown at 42, to facilitate circulation of the electrolyte.

The posts 35, if desired, may be extended upwardly through openings in the top 43 to provide binding posts for connection of the bus bars as in the first form, but I have provided an improved connection which will distribute the current substantially uniformly to the various plates and will also decrease the size of the posts required. For this purpose I have shown extending from each binding post 44 two leads or conductors 45 and 46, the short lead 45 being connected to the post 35 at a point 47 located a distance from the upper end thereof substantially equal to one quarter the length of this post, and the long lead 46 at a point 48 substantially the same distance from the other end of the post or three quarters the length of the post from the top thereof. Thus it will be seen that the short lead will supply the plates at the upper half of the unit while the longer lead will supply the plates at the lower half of the unit and the posts need not be greater in cross section than is required to carry current to one quarter of the plates connected to this post. In other words the posts need only be one fourth the cross sectional area of a post to which all the current is applied at one end. I have shown two leads only but this is merely illustrative and obviously more may be used if found expedient as where an unusually high unit using an unusually large number of plates is employed.

As shown in Fig. 6, I have also extended this system of connections to the leads leading to the bus bar so as to get a more uniform distribution of current to the units as well as to the plates contained in the units, and also so as to reduce the size of the bus bars. As shown in the drawing the leads 45 and 46 are extended through the top 43 of the container to form binding posts 44 to which the bus bars 49 are connected by any suitable means such as burning, the positive posts of one row of units being connected to a single bus bar and the negative posts of the same row of units being connected to another bus bar.

In Fig. 6, I have shown the posts of four units connected to a single bus bar. Of course the numbers may be varied as found necessary or desirable. In carrying out this system of connections, by way of example, I conduct to each bus bar two leads 50 and 51 leading from a common connection 52, the short lead being connected to the bus bar 48 intermediate the first two units, as shown at 53, and the long lead 51 being connected intermediate the other two units, as indicated at 54, the units being indicated by the dotted circles 55. Thus it will be seen that each lead 53 or 54 conducts current to two units which is equally divided between them, and the connections 53 and 54 are intermediate the ends of the bus bar and spaced longitudinally of the same. This same system of connection is used throughout the cells. In the present instance I have shown in each cell three rows of units with four units to each row, and two bus bars connected to the binding posts from each row of four, one for the positive and one for the negative plates of this row of units. The positive leads from each row are all connected to a common conductor 52, and in a battery in which a plurality of cells are used the positive conductors 52 are connected to a common conductor 56 from which a conductor 57 leads from a point of supply or use. Similarly all the leads 50—51 of the opposite polarity are connected to a common conductor 52, and where a plurality of cells are used in parallel these are in turn connected to a common conductor 58 of which the lead 59 is carried to a source of supply or point of use. These cells are of course also adapted for use in series with each other the same as are ordinary cells, by connecting the positive leads 52 of each cell to the negative leads 52 of the adjacent cell as will be obvious.

The casings 38 may be of other shapes if desired, as square or rectangular in cross section, but I prefer the cylindrical casing as it gives better space for electrolyte at the edges of the plates. The cylindrical tubes also provide increased space for electrolyte between the casings so that there will be more equal distribution and better circulation of this electrolyte and it will have free access to the active material carried by plates at all times.

It will be apparent from the foregoing description that the individual plates for carrying the active material are very simple in construction and as they are of small area may be made of a thickness relatively great with respect to this area and still be comparatively thin so that a large number of these plates may be assembled in a single unit giving a large exposed surface of active material per unit of weight to the electrolyte. Also that it is practicable to largely increase the number of these plates by decreasing their size and thickness to almost any extent and thus carry to an indefinite degree the system of subdivision of the active material. I have found plates of about one inch square and one sixteenth inch or less in thickness to be very strong and rugged and satisfactory for the purpose although these dimensions may be varied considerably if desired. They especially may be made of smaller area and thinner to carry out to a still greater extent the idea of subdivision of the active material. To what extent this may be practicable, however, I have not as yet fully determined.

It is, however, an engineering necessity in carrying out this principle of subdivison of the active material to have as many units as practicable, each unit consisting of very small plates so as to gain as great a surface exposure of active material as possible, and as thin a plate as necessary for properly exposing the active material contained in the plates.

Also the large number of units in a multiple unit cell necessitate the proper and practical connecting up of this multiplicity of units so that the cell as a whole can take the greatest possible current in charging, and can give out the greatest possible current required in discharging. Further, the connections involved in this multiple unit cell should be such that it will be a simple and practical matter to connect cell to cell without unnecessary complications.

It will further be apparent that the completed units, each comprising a set of positive and negative plates, may be kept in stock and merely assembled in one or more cells to give the size and capacity of battery desired. As there is no loosening of the active material from the plates there is no necessity of providing a large mud chamber beneath the plates as is now general practice in batteries commonly in use. With the extended subdivision of the active material made possible by my multiple unit cell I am enabled to secure an extended exposure of the surface of the active material per unit of weight to the electrolyte so that I may use increased rates of charge and discharge without increasing the current density per unit of surface above that considered as good practice, and am also enabled to secure all the advantages enumerated above.

Having thus set forth the nature of my invention, what I claim is:

1. A storage battery cell comprising a plurality of electrical units in a common electrolyte, each unit being a complete electrical entity consisting of positive and negative plates, and a perforated container enclosing each unit.

2. A storage battery cell comprising a plurality of electrical units in a common electrolyte, each unit being a complete electrical entity comprising a plurality of spaced substantially horizontally arranged relatively thin positive and negative plates, porous spacing elements between the plates, upright conducting posts connecting the positive and negative plates respectively, and a perforated container for the respective units.

3. A storage battery cell comprising a plurality of electrical units in a common electrolyte, each unit being a complete electrical entity comprising a plurality of vertically spaced substantially horizontally arranged positive and negative plates, porous spacing elements between said plates, perforated containers for the respective units, upright conducting elements connected respectively to the positive and negative plates in the units, and conducting elements connected respectively to the said positive and negative conducting elements in the cell.

4. In a storage battery cell, a plurality of spaced plates adapted to hold active material, a conducting post connecting said plates, and a plurality of conducting leads extending from outside the cell connected to said post intermediate the ends thereof and at longitudinally spaced positions to give substantially uniform current distribution to the respective plates.

5. In a storage battery cell, a plurality of vertically spaced substantially horizontally arranged plates adapted to hold active material, an upright conducting post connecting said plates, and a plurality of conducting leads extending from outside the cell connected to said post intermediate the ends thereof and at vertically spaced positions to give substantially uniform current distribution to the respective plates.

6. A storage battery cell comprising a plurality of electrical units in a common electrolyte, each unit being a complete electrical entity comprising a plurality of substantially horizontally arranged vertically spaced positive and negative plates adapted to hold active material, upright conducting posts connecting the positive and negative plates respectively, and a plurality of conducting leads connected to each post intermediate the ends thereof and at vertically spaced positions to give substantially uniform current distribution to the respective plates.

7. A storage battery cell comprising a plurality of electrical units, each unit being a complete electrical entity consisting of positive and negative plates, conducting posts connecting the positive and negative plates respectively, bus bars connecting the positive and negative posts respectively, and a plurality of conducting leads connected to each bus bar intermediate the ends thereof and at positions spaced longitudinally of the bars to give a substantially uniform current distribution to the respective units.

8. A storage battery cell comprising a plurality of electrical units, each unit being a complete electrical entity comprising a plurality of substantially horizontally arranged vertically spaced positive and negative plates to hold active material, upright conducting posts connecting the positive and negative plates respectively, a plurality of conducting leads connected to each post intermediate the ends thereof and at vertically spaced positions to give substantially uniform current distribution to the respective plates, bus bars connecting the positive and negative leads respectively, and a plurality of conducting leads connected to each bus bar intermediate the ends thereof and at positions spaced longitudinally of the bars to give a substantially uniform current distribution to the respective units.

In testimony whereof I affix my signature.

NEWTON HARRISON.